April 8, 1969   J. SPIEGLER   3,437,974
HIGH STRENGTH RESISTOR
Filed Dec. 9, 1966

INVENTOR.
JOHN SPIEGLER

BY *William J. Simmons Jr*

ATTORNEY

United States Patent Office 3,437,974
Patented Apr. 8, 1969

3,437,974
HIGH STRENGTH RESISTOR
John Spiegler, Bradford, Pa., assignor to Corning Glass Works, Corning, N.Y., a corporation of New York
Filed Dec. 9, 1966, Ser. No. 600,512
Int. Cl. H01c 7/02; H01b 17/62
U.S. Cl. 338—300     7 Claims

ABSTRACT OF THE DISCLOSURE

A resistor, the substrate of which comprises a glass core with a glass sheath on the core, the coefficient of expansion of the sheath being lower than that of the core to strengthen the substrate. A resistive film is placed on the sheath.

---

Figure 1:
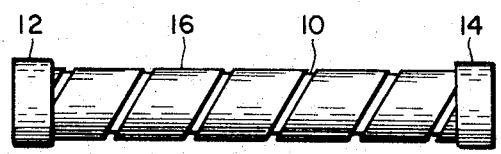

Resistors of the type comprising a glass body in the form of a tube, rod or sheet, an adherent electroconductive metal or metal oxide film on the surface of the body, and spaced electroconductive terminals in electrical contact with the film are well described in the prior art. Such resistors are produced by heating a glass substrate, suitably preformed from a glass of any desired type or composition, and then exposing the heated substrate to the vapor or atomized solution of a selected hydrolyzable material to produce on the exposed glass surface a thin, strongly adherent, electroconductive film. Numerous suitable materials and mixtures for producing such films have been disclosed including the chlorides, bromides, iodides, sulphates, nitrates, oxalates, and acetates of tin, indium, cadmium, tin and antimony, tin and indium, or tin and cadmium either with or without a similar hydrolyzable salt or other compound of a modifying metal such as zinc, iron, copper or chromium. The film consists of a corresponding metal oxide or oxides. Since the present invention is not concerned with either new film compositions or methods of film production, reference should be made to the prior art for further details in these respects.

The thickness of the film increases with the length of time the heated body is contacted with the vapor or atomized solution, and the electrical resistance of the film generally decreases as its thickness increases. Films having thicknesses from less than the first order of interference colors up to about the tenth order and corresponding electrical resistances of 1,000,000 or more down to 5 or less ohms per unit square can thus be produced. Higher resistances can also be obtained by removing a portion of the resistive film which has been deposited on a cylindrical body to shape the film into a spiral strip of predetermined width and length. Some of the methods which may be used to remove the resistive film from the glass cylinder are cutting, grinding, sandblasting and the like.

Resistors comprising electroconductive films of this type provide distinct advantages over other types of resistors for many purposes. However, since glass and other nonmetallics are notoriously weak in tension, glass resistors become weakened when the surface is scratched during the manufacturing process and especially during the process of removing the resistive film during the spiraling process. This creates a serious breakage problem in small diameter resistors which often does not manifest itself until these resistors are in use and excessive stresses are placed on them. Since these resistors usually have an epoxy coating placed over them in the final stages of manufacturing, the breakage often does not occur until the mounted parts are in operation. The probable cause for this delayed breakage is that stress placed on the part in mounting is resisted by the coating. When the part heats up during operation, the plastic coating softens and transfers the stresses to the glass which may then be overstressed.

Since glass is weak in tension, a major increase in strength is achieved if the surface is put into compression. It is suggested in U.S. Patent No. 3,069,294, issued Dec. 18, 1962, to James K. Davis, that the electrical, thermal, chemical and mechanical stabilities of such a resistor can be greatly improved by covering the exposed portion of the resistive film between the spaced metallic terminals with a layer of ceramic glaze or enamel frit. It is further suggested that the thermal expansion coefficient of the enamel is advantageously somewhat lower than that of the ceramic body, resulting in a slight compressional stress in the surface of the resistor which tends to increase its mechanical and thermal strength. However, such a coating does not appreciably increase the strength of the resistor since there is no intimate bond between the coating and the substrate. The coating primarily serves as an insulation or protective coating and, therefore, is applied over the resistive film. The resistive film is situated between the ceramic substrate and the ceramic enamel coating and, therefore, prevents an intimate bonding therebetween.

Some other methods which can be used to put the surface of a glass substrate into compression are heat treating, chemical surface treatments, and the like. However, these processes have not been found to be practical when applied to the manufacture of resistors since they interfere with the properties of the resistive coating.

It is accordingly an object of this invention to provide a method of strengthening glass resistors which does not interfere with the resistive coating thereon.

Another object of this invention is to provide a glass resistor which can be made in small diameter sizes and yet not exhibit a breakage problem.

Briefly, these objects are achieved by utilizing a glass substrate which consists of a glass core surrounded by a glass sheath which is intimately bonded thereto. The characteristics of the glasses constituting the sheath and the core are such that the sheath is put into compression at the operating temperatures of the resistors which are made from such substrates. Resistors made in this manner are stronger than those made from homogenous glass substrates, and resistors can now be made having smaller diameters than were heretofore possible.

Additional objects, features and advantages of the present invention will become apparent to those skilled in the art from the following detailed description and the attached drawing on which, by way of example, only the preferred embodiment of this invention is illustrated.

Figure 2:
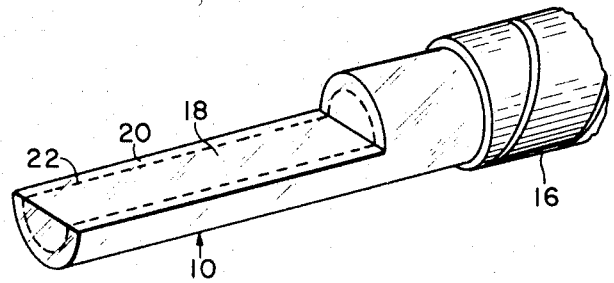

FIGURE 1 is a side elevation of a preferred embodiment of a resistor constructed in accordance with this invention, and FIGURE 2 is a perspective view which illustrates the resistor of FIGURE 1 in partial section.

As FIGURE 1 illustrates, the external appearance of a resistor made in accordance with this invention is well known. In this figure, a glass substrate 10 has low resistance metal bands or terminals 12 and 14 formed thereon at its ends, with an electrically conductive coating 16 of resistance material in ribbon form spiraled about the substrate 10 between the bands 12 and 14. As indicated hereinabove, the resistive coating 16 is initially uniformly applied over the substrate. The coating 16 is then spiraled by removing a portion thereof by cutting, grinding or sandblasting. This process may scratch the surface of the glass substrate 10 making it vulnerable to breakage especially when a bending force is applied thereto.

To alleviate the breakage problem the glass substrate 10, which is more clearly illustrated in FIGURE 2, consists of a high expansion glass core 18 and a low expansion glass sheath 20 which, in combination, provide a substrate which is considerably stronger in beam strength than either glass alone could provide. The core and sheath glasses are united at elevated temperatures, and their coefficients of expansion are chosen so that the sheath is put into compression at room temperature. The dashed line 22 illustrates the intimate bond which is formed where the core glass 18 and the sheath glass 20 are fused together. The core glass is primarily chosen to be one having a high coefficient of thermal expansion. In addition to having a low coefficient of thermal expansion, the sheath glass must also be substantially free from alkali metal ions which have a detrimental influence on the stability of the resistive film 16. Reference may be made to U.S. Patent No. 2,934,736 issued Apr. 26, 1960, to James K. Davis for a discussion of the detrimental effects of alkali metal ions on resistive films.

The following method of making resistors in accordance with this invention is set forth solely as an illustrative example so that those skilled in the art may more readily understand and practice the invention. In the table below the glass compositions suitable for use in forming the core and sheath are set forth as calculated from the glass batches in weight percent on the oxide basis:

|  | Sheath | Core |
|---|---|---|
| $SiO_2$ | 58 | 58 |
| $Al_2O_3$ | 15 | 20 |
| CaO | 10 | 3 |
| MgO | 7 | 2 |
| BaO | 6 |  |
| $B_2O_3$ | 4 |  |
| $Na_2O$ |  | 13 |
| $K_2O$ |  | .4 |
| Exp. coeff. $\times 10^{-7}$ per °C | 46 | 92.1 |

A double orifice glass forming unit similar to that shown in FIGURE 4 of U.S. Patent No. 3,209,641 issued Oct. 5, 1965, to Lee O. Upton is located at the top of a 35 foot tower. The inner core glass and the outer sheath glass, examples of which are set forth in the above table, are melted simultaneously but in separate chambers, and are drawn out together. The relative position of the melting chambers and the size of the annular space left between them determines the amount of sheath glass to be clad on to the core glass during the drawing process. Moreover, the respective glass temperatures, viscosities and compositions also affect the core to sheath thickness ratio. The rod diameter is a function of the temperature, viscosity and drawing speed. As the rod is continuously drawn downwardly it encounters a heating zone which maintains the rod at a temperature of about 600° to 700° C. Following this heating zone are three film deposition steps where a vapor containing tin oxide and antimony or indium oxide is passed over the rod and deposited on the glass. Methods of preparing electroconductive metal oxide films and electrical resistors comprising them are described in detail in U.S. Patent No. 2,564,706 issued Aug. 21, 1951, to John M. Mochel. At the bottom of the tower the coated glass rod, which appears dark blue in color, is cut into individual resistors, and electrodes are attached. The electroconductive film may be spiraled if a higher value of resistance is desired.

In two differently sized resistors which have been manufactured according to the above mentioned process, the overall diameter of the glass rod is .045 inch and .061 inch and the sheath thickness is .0035 inch and .005 inch respectively. It is noted from the above table that the coefficient of thermal expansion of the core is about twice that of the sheath and that the sheath glass is substantially free from alkali metal ions. Furthermore, the core and the sheath must be maintained concentrically to produce high strength resistors.

Tests comparing resistors made in accordance with the above example with slightly larger conventionally made glass resistors indicated that resistors made on glass clad substrates can withstand about four times as much force as a conventional glass resistor before breaking.

Although the preferred method of making the glass clad resistor substrate is the double orifice method, it could also be made by the redraw method, whereby the core is prepared by grinding and acid etching and is placed inside a piece of sheath tubing. The end of this combination is immersed in a redraw furnace, and the combined glasses are drawn out at the desired speed.

Although the preferred film is one containing tin oxide and antimony or indium oxide, any resistive film can be clad on this double glass rod to be further fabricated into miniature resistors. Films may be applied in several layers, and different properties can be obtained by choosing the proper films in each layer.

Although the present invention has been described with respect to specific details of one embodiment thereof, it is not intended that such details be limitations on the scope of the invention except insofar as set forth in the following claims.

What is claimed is:

1. An electrical resistor comprising a monolithic glass body consisting of a glass core and a glass sheath surrounding said core, the coefficient of expansion of said glass sheath being substantially less than that of said glass core, an adherent resistive film on the surface of said body, and spaced, electrically conducting terminal members in electrical contact with said film.

2. The electrical resistor of claim 1 in which said glass sheath is substantially free from alkali metal ions.

3. The electrical resistor of claim 1 in which the resistive film contains an oxide of tin and an oxide of antimony.

4. The electrical resistor of claim 1 in which the resistive film contains an oxide of tin and an oxide of indium.

5. The electrical resistor of claim 1 in which said glass core is cylindrical in shape and said glass sheath is concentric with said glass core and said resistive film is in the form of a spiral.

6. The electrical resistor of claim 1 wherein the coefficient of expansion of said glass core is about twice the coefficient of expansion of said glass sheath.

7. The electrical resistor of claim 1 wherein the overall diameter of the glass body is up to 0.061 inch.

References Cited

UNITED STATES PATENTS

| 2,838,639 | 6/1958 | Planer | 338—300 X |
| 2,915,730 | 12/1959 | Davis | 117—215 X |
| 3,010,092 | 11/1961 | Caddock | 117—217 X |
| 3,069,294 | 12/1962 | Davis | 117—215 X |

FOREIGN PATENTS

| 645,800 | 7/1928 | France. |

LEWIS H. MYERS, *Primary Examiner.*

E. A. GOLDBERG, *Assistant Examiner.*

U.S. Cl. X.R.

338—308, 321; 117—215, 217